United States Patent
Mankame et al.

(10) Patent No.: US 9,016,446 B2
(45) Date of Patent: Apr. 28, 2015

(54) HIGH ENERGY DENSITY MAGNETIC SPRINGS USING SPATIALLY MODULATED MAGNETIC FIELDS TECHNOLOGY

(75) Inventors: Nilesh D. Mankame, Ann Arbor, MI (US); Paul E. Krajewski, Troy, MI (US); Roy J. Mathieu, Rochester Hills, MI (US); Albert H. Butlin, Jr., Beverly Hills, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 13/527,740

(22) Filed: Jun. 20, 2012

(65) Prior Publication Data

US 2013/0341137 A1 Dec. 26, 2013

(51) Int. Cl.
*F16F 15/03* (2006.01)
*F16F 6/00* (2006.01)

(52) U.S. Cl.
CPC .............. *F16F 6/00* (2013.01); *F16F 2222/06* (2013.01); *F16F 15/03* (2013.01)

(58) Field of Classification Search
CPC ....... H02K 7/09; H02K 49/102; H02K 51/00; F16F 15/03; F16F 15/035; F16F 2222/06; F16F 7/082

USPC .............. 188/266, 267, 267.2; 310/90.5, 103
See application file for complete search history.

(56) References Cited

U.S. PATENT DOCUMENTS

| | | | | |
|---|---|---|---|---|
| 5,159,219 | A * | 10/1992 | Chu et al. | 310/90.5 |
| 5,216,308 | A * | 6/1993 | Meeks | 310/90.5 |
| 5,994,809 | A * | 11/1999 | Ackermann | 310/103 |
| 2010/0282528 | A1 * | 11/2010 | Palti | 180/65.1 |
| 2011/0121674 | A1 * | 5/2011 | Bright et al. | 310/103 |
| 2012/0119463 | A1 * | 5/2012 | Paulides et al. | 280/124.106 |
| 2012/0193179 | A1 * | 8/2012 | Gysen et al. | 188/267 |
| 2012/0279345 | A1 * | 11/2012 | Bergander et al. | 74/512 |
| 2013/0002075 | A1 * | 1/2013 | Edwards et al. | 310/103 |
| 2013/0033136 | A1 * | 2/2013 | McMullen | 310/74 |

* cited by examiner

*Primary Examiner* — Vishal Sahni
(74) *Attorney, Agent, or Firm* — Mark S. Cohen; Pearl Cohen Zedek Latzer Baratz LLP

(57) ABSTRACT

A magnetic spring utilizing spatially modulated magnetic field patterns of magnetic regions for both stator and slider, allowing custom force curves over the range of motion. Also disclosed is a magnetic spring whose slider can be rotated relative to the stator on the axis, such that the alignment of the spatially modulated magnetic field patterns of the slider and the stator is altered, resulting in changeable force curve for the spring, selected by rotating the slider.

5 Claims, 4 Drawing Sheets

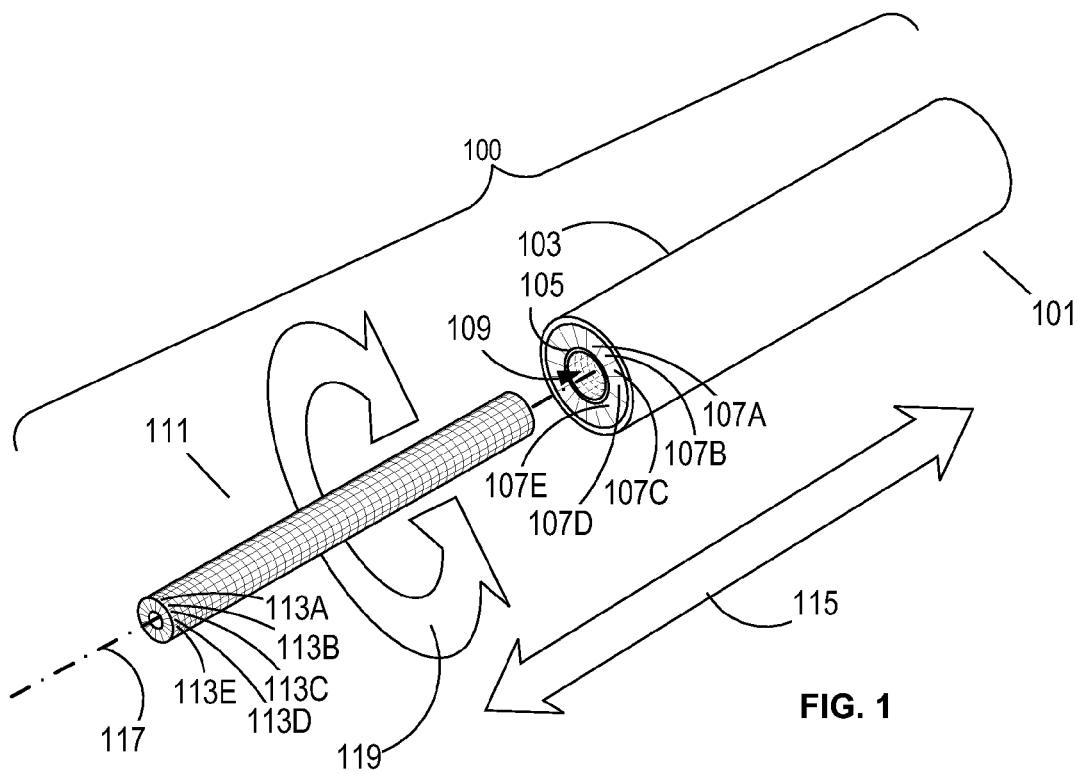
FIG. 1
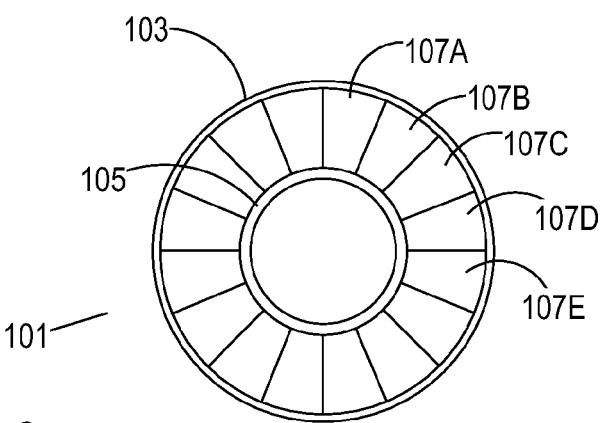
FIG. 2
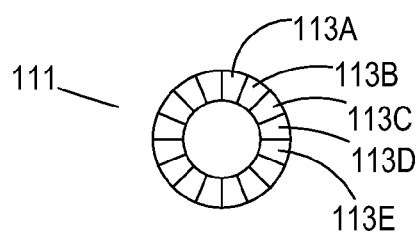

US 9,016,446 B2

HIGH ENERGY DENSITY MAGNETIC SPRINGS USING SPATIALLY MODULATED MAGNETIC FIELDS TECHNOLOGY

BACKGROUND

Magnetic springs offer benefits of compactness and high energy density, similar to fluidic springs, but without the disadvantages of leakage and temperature dependence. In addition, magnetic springs offer the possibility of constant force over the operating range, as opposed to mechanical springs, which feature a force that varies linearly according to displacement.

SUMMARY

The present invention provides a magnetic spring based on spatially modulated magnetic field patterns and having a customized force curve over the operating range. Additional embodiments of the invention provide a magnetic spring with multiple force curves, such that the active force curve is selected according to the azimuthal angular position of the spring's sliding shaft relative to the stator.

Therefore, according to embodiments of the present invention, there is provided a magnetic spring comprising: (a) a stator having a first spatially modulated magnetic field pattern of magnetic regions; and (b) a slider having a second spatially modulated magnetic field pattern of magnetic regions; wherein the stator and the slider are mechanically constrained to have a spatial relationship such that: (i) the slider and stator are mechanically free to undergo an axial movement relative to one another along a predefined axis over a predefined axial range, resulting in an axial displacement of the slider and stator relative to one another; (ii) the first spatially modulated magnetic field pattern and the second spatially modulated magnetic field pattern interact magnetically to have a magnetic interaction according to the spatial relationship and the axial displacement, so that an axial force arising from the magnetic interaction exists between the stator and the slider; and (iii) the axial force between the stator and the slider is a function of the axial displacement of the slider and the stator relative to one another along the predefined axis within the predefined axial range.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 1 is an exploded isometric view illustrating the components of a magnetic spring according to an embodiment of the present invention.

FIG. 2 shows axial views separately illustrating the stator and slider of the magnetic spring of FIG. 1.

Figure 3:
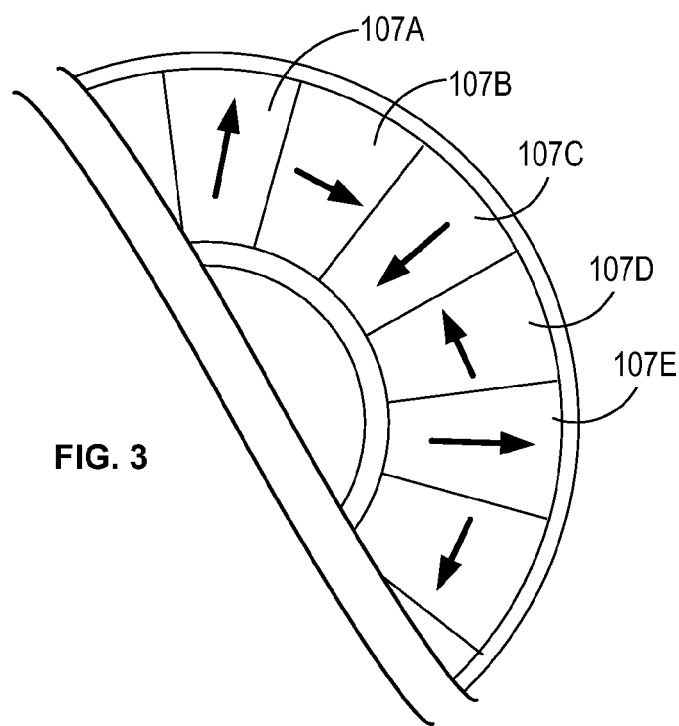
FIG. 3 illustrates a non-limiting example of a spatially modulated magnetic field pattern of regional magnetic orientation in a magnetic spring stator according to the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

FIG. 1 illustrates the components and makeup of a magnetic spring 100 according to an embodiment of the present invention. A stator 101 has a protective outer casing 103 and a thin low-friction inner bearing 105 around a recess 109 inside which a slider 111 fits and slides in and out in directions 115 along a longitudinal axis 117. Between casing 103 and bearing 105 is a magnetic material having a spatially modulated magnetic field pattern of magnetic regions, such as in representative regions 107A, 107B, 107C, 107D, and 107E. Spatially modulated magnetic field patterns of magnets and magnetic regions are known in the art, and techniques of creating predetermined spatially modulated magnetic field patterns of magnetic regions are also known in the art. According to embodiments of the present invention, such techniques may be utilized to create spatially modulated magnetic field patterns of magnetic regions in the components of a magnetic spring as described herein.

In certain embodiments of the invention, stator 101 and slider 111 feature patterns which are spatially-modulated both axially and azimuthally.

Slider 111 contains a magnetic material, also having a spatially modulated magnetic field pattern of magnetic regions, such as in representative regions 113A, 113B, 113C, 113D, and 113E. FIG. 2 shows enlarged axial views of stator 101 and slider 111. The magnetic interaction between the spatially modulated magnetic field pattern of magnetic regions in stator 101 and the spatially modulated magnetic field pattern of magnetic regions in slider 111 give rise to an axial force between stator 101 and slider 111, which is a function of the axial displacement of slider 111 relative to stator 101.

FIG. 3 shows a non-limiting example of a spatially modulated magnetic field pattern of magnetic regions in representative regions 107A, 107B, 107C, 107D, and 107E, according to an embodiment of the present invention. The arrows in the representative regions shown in FIG. 3 represent the respective magnetic moment vectors of the regions, with the arrows pointing according to the common convention, from the respective south poles to the respective north poles. The term "spatially modulated magnetic field pattern" denotes that the specific pattern of magnetic orientations in the magnetic regions is according to a predetermined arrangement.

Figure 4:
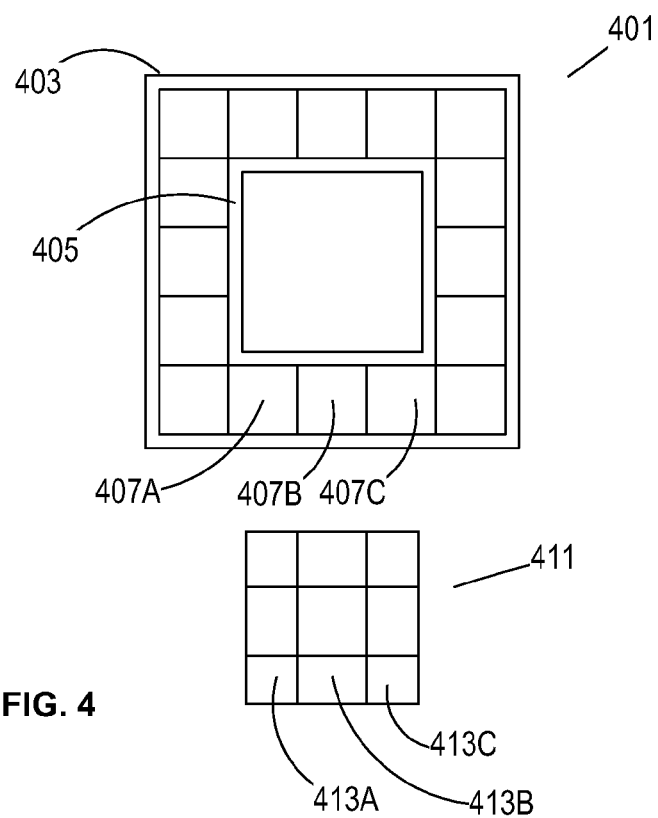
FIG. 4 shows axial views separately illustrating the stator and slider of a magnetic spring according to another embodiment of the present invention.

In some embodiments of the present invention, slider 111 may be mechanically free to be rotated inside stator 101 in directions 119 (FIG. 1) to change azimuthal orientation. In other embodiments, slider 111 may be constrained to a particular range or set of values of azimuthal orientation. In specific embodiments, constraints may be imposed magnetically, by the particular spatially modulated magnetic field patterns of the magnetic regions; in other specific embodiments, constraints may be imposed mechanically, such as by a keyed channel, or by the geometry of the stator and slider. For example, instead of using a cylindrically-symmetrical geometry for the slider and its recess, as in FIG. 1 and FIG. 2, a prismatic geometry lacking continuous rotational symmetry can be used. FIG. 4 shows axial views of a non-limiting example of a prismatic stator 401 with a square cross-section and having an outer casing 403 and an inner bearing 405 for a corresponding slider 411. In this example, stator 401 contains a spatially modulated magnetic field pattern of magnetic regions, such as in representative regions 407A, 407B, and 407C; and slider 411 also contains a spatially modulated magnetic field pattern of magnetic regions, such as in representative regions 413A, 413B, and 413C. In still other embodiments of the present invention, the geometry of the slider and the stator recess can be such that there is no rotational symmetry at all, in which case the slider-stator azimuthal angular alignment is fixed so long as the slider remains inserted in the stator. If the slider is removable from the stator, however, the azimuthal angular alignment can be changed by removal, reorientation, and re-insertion.

Figure 5:
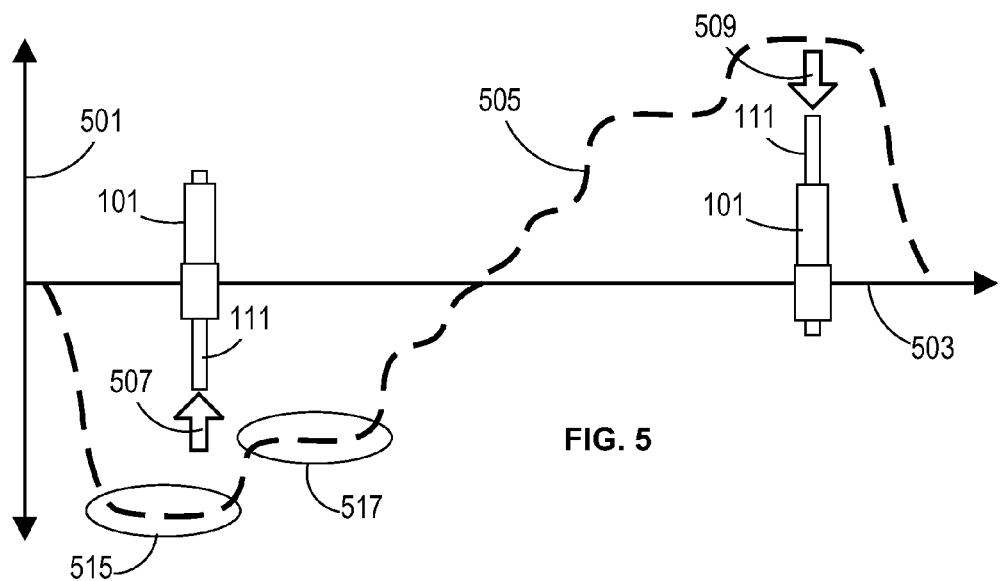
FIG. 5 illustrates a non-limiting example of a force curve for a magnetic spring according to an embodiment of the present invention.

FIG. 5 illustrates a non-limiting example of a force curve 505 for a magnetic spring according to an embodiment of the present invention. Stator 101 and slider 111 are mechanically free to undergo an axial movement relative to one another along axis 117 (FIG. 1) over a predefined range in a direction 507 or in a direction 509. Slider 111 and stator 101 have a spatial relationship with a magnetic interaction between the spatially modulated magnetic field pattern of magnetic regions in slider 111 with the spatially modulated magnetic field pattern of magnetic regions in stator 101. The magnetic interaction results in axial force curve 505, which is a function of the axial displacement of slider 111 relative to stator 101. Axial force 505 is plotted according to a force axis 501 against an axial displacement axis 503. The precise form of force curve 505 depends on the specific properties of the spatially modulated magnetic field patterns of magnetic regions. In this non-limiting example, a portion 515 exhibits a relatively constant force over a portion of the displacement range, and another portion 517 exhibits a different relatively constant force over another portion of the displacement range. Embodiments of the present invention provide different force curves by having different spatially modulated magnetic field patterns of magnetic regions in the slider and/or stator.

Figure 6A:
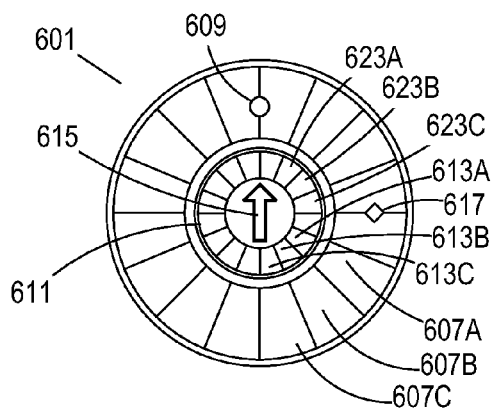
FIG. 6A is an axial view illustrating a magnetic spring according to another embodiment of the present invention with a slider in a first azimuthal orientation.
Figure 6B:
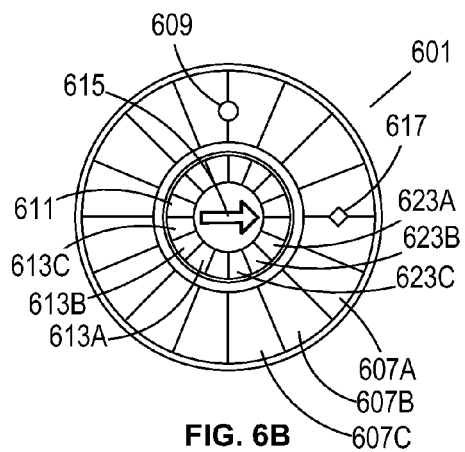
FIG. 6B is an axial view illustrating the magnetic spring of FIG. 6A, with the slider in a second azimuthal orientation.
Figure 7:
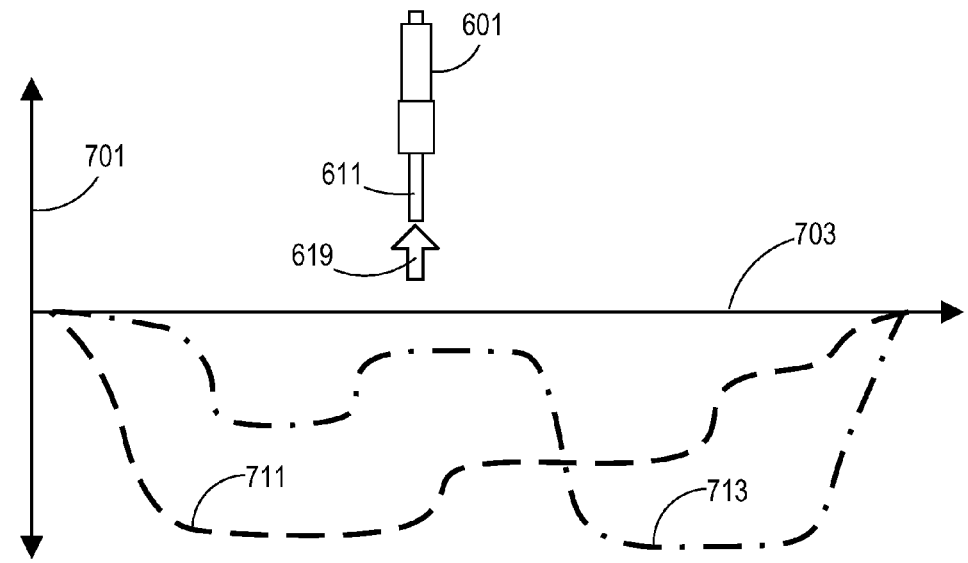
FIG. 7 illustrates a non-limiting example of two respective force curves for the magnetic spring of FIG. 6A and FIG. 6B in the two azimuthal orientations.

FIG. 6A is an axial view illustrating a magnetic spring according to another embodiment of the present invention that provides different force curves in the same magnetic spring, which are selected by rotating the slider to different predetermined angular positions relative to the angular position of the stator. A stator 601 has an index mark 609 in one angular position, and another index mark 617 in another angular position. A slider 611 has an indicator 615 showing an azimuthal angular alignment with index mark 609, so that representative magnetic regions 613A, 613B, and 613C of slider 611 align with representative magnetic regions 607A, 607B, and 607C, respectively, of stator 601. FIG. 6B is an axial view illustrating the magnetic spring of FIG. 6A, but with slider 611 rotated azimuthally so that indicator 615 shows an azimuthal angular alignment with index mark 617, whereupon representative magnetic regions 613A, 613B, and 613C of slider 611 do not align with representative magnetic regions 607A, 607B, and 607C, respectively, of stator 601. Instead, a different set of magnetic regions 623A, 623B and 623C on slider 611 align with the set of magnetic regions 607A, 607B and 607C respectively. FIG. 7 illustrates non-limiting examples of a force curve 711 corresponding to the slider-stator azimuthal angular displacement of FIG. 6A, and a force curve 713 corresponding to the slider-stator azimuthal angular displacement of FIG. 6B. Both curve 711 and curve 713 are plotted according to a force axis 701 against an axial displacement axis 703 for displacement in a direction 619.

A single magnetic spring according to this embodiment of the present invention can provide different spring characteristics for a particular application simply by rotating the slider to a different position relative to the stator. Since the rotation is relative to the slider, this embodiment can be used in a configuration where the slider has a fixed rotational position, and it is the stator which is rotated instead, to select the spring characteristics.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A magnetic spring comprising:
   a stator having a first spatially modulated magnetic field pattern of magnetic regions; and
   a slider having a second spatially modulated magnetic field pattern of magnetic regions;
   wherein:
      the slider is removable from the stator;
      the stator and the slider are mechanically constrained to have a spatial relationship when the slider remains inserted in the stator, such that the slider and the stator are mechanically free to undergo an axial movement relative to one another along a predefined axis over a predefined axial range, the axial movement resulting in an axial displacement of the slider and the stator relative to one another;
      the first spatially modulated magnetic field pattern and the second spatially modulated magnetic field pattern interact magnetically to have a magnetic interaction according to the spatial relationship and the axial displacement, so that an axial force arising from the magnetic interaction exists between the stator and the slider;
      the axial force between the stator and the slider is an axial force curve function of the axial displacement of the slider and the stator relative to one another along the predefined axis within the predefined axial range;
      a slider-stator azimuthal angular alignment is fixed when the slider remains inserted in the stator;
      the slider-stator azimuthal angular alignment is changeable by a removal of the slider from the stator followed by a reorientation of the slider-stator azimuthal angular alignment and a re-insertion of the slider into the stator; and
      the axial force curve function is different for different predetermined angular displacements of the stator relative to the slider.

2. The magnetic spring of claim 1, wherein the stator and the slider are constrained from undergoing an azimuthal angular displacement by the magnetic interaction when the slider remains inserted in the stator.

3. The magnetic spring of claim 1, wherein the stator and the slider are constrained mechanically from undergoing an azimuthal angular displacement when the slider remains inserted in the stator.

4. The magnetic spring of claim 1, having at least two different predetermined angular displacements of the stator relative to the slider.

5. The magnetic spring of claim 3, wherein the stator and the slider are constrained mechanically when the slider remains inserted in the stator by a prismatic geometry lacking continuous rotational symmetry.

* * * * *